H. C. PERCY.
FREIGHT CAR DOOR.
APPLICATION FILED JUNE 2, 1909.
981,793.
Patented Jan. 17, 1911.
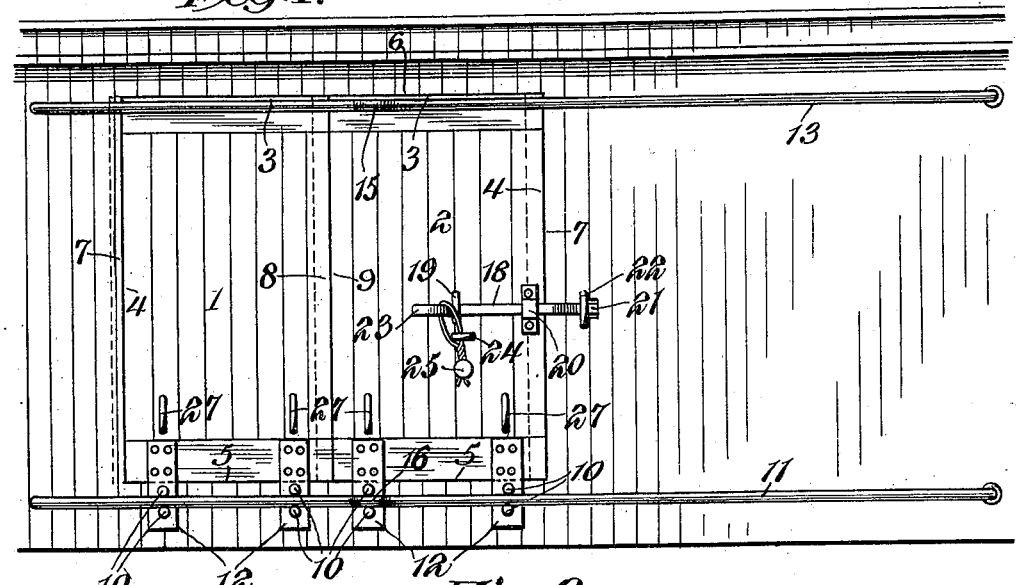
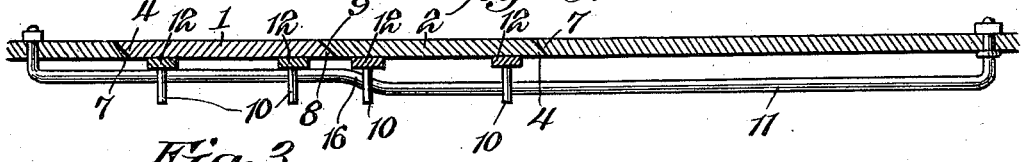
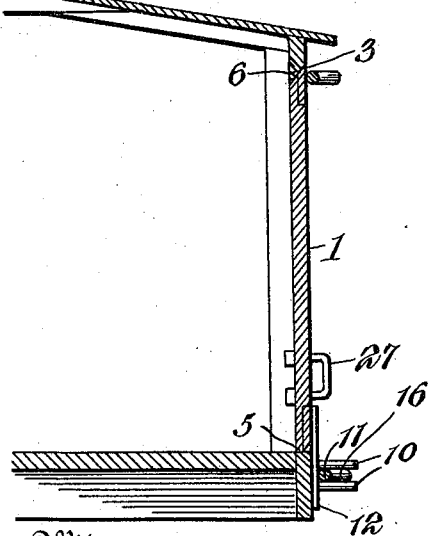
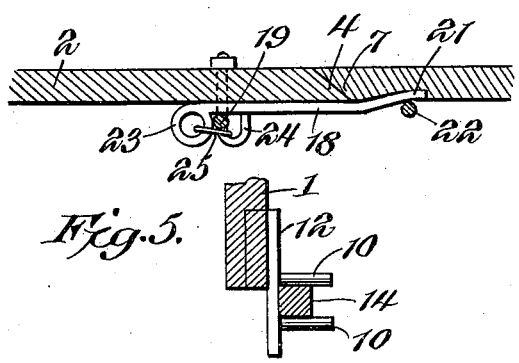
Harry C. Percy, Inventor,
Witnesses

UNITED STATES PATENT OFFICE.

HARRY CHAPLIN PERCY, OF NATCHITOCHES, LOUISIANA.

FREIGHT-CAR DOOR.

981,793.  Specification of Letters Patent.  Patented Jan. 17, 1911.

Application filed June 2, 1909. Serial No. 499,698.

*To all whom it may concern:*

Be it known that I, HARRY CHAPLIN PERCY, a citizen of the United States, residing at Natchitoches, in the parish of Natchitoches and State of Louisiana, have invented a new and useful Freight-Car Door, of which the following is a specification.

The invention relates to improvements in freight car doors.

The object of the present invention is to improve the construction of freight car doors, and to provide a simple and comparatively inexpensive freight car door, which, when closed, will be flush with the outer face of the side of the car and perfectly tight so as to exclude sparks.

A further object of the invention is to provide a car door of this character composed of a plurality of sections, capable of being locked by a single fastening device, and adapted to be readily operated to open or close one or both of the sections.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a portion of a car provided with a car door, constructed in accordance with this invention and shown closed. Fig. 2 is a horizontal sectional view of the same. Fig. 3 is a vertical sectional view. Fig. 4 is a detail sectional view, illustrating the construction of the latch. Fig. 5 is an enlarged detail sectional view of one of the bottom guides or hangers, showing the same in connection with a square guide bar.

Like numerals of reference designate corresponding parts in all the figures of the drawing.

The freight car door is composed of front and rear sections 1 and 2, provided with beveled upper and side edges 3 and 4, the lower edges 5 being square and horizontal in order to enable the sections of the door to be supported by the sill of the car. The top and side edges 6 and 7 of the car at the door opening are correspondingly beveled to fit the beveled edges of the sections of the car door, which, when closed, is arranged in flush relation with the outer face of the side of the car. The outer or front edge of the front section 1 is beveled at the outer face, and the car is beveled at the inner face at the front of the door opening so that the front vertical beveled edge of the section 1 extends into the door opening and is interlocked with the side of the car when the door is closed. The side of the car door is beveled at the outer face at the rear edge of the door opening to enable the rear section, when unlocked, to slide rearwardly. The inner contiguous side edges 8 and 9 of the sections are beveled, as clearly illustrated in Fig. 2 of the drawing. The inner edge 8 of the front section 1 is beveled at the inner face, and the edge 9 of the rear section is beveled at the front face, so that the front edge of the rear section 2 extends back of the front section 1 and is interlocked therewith, and held against outward movement when the outer or rear edge of the section 2 is locked by the means hereinafter described.

The sections 1 and 2 of the door are provided at the bottom with outwardly extending horizontally disposed guides or hangers 10, approximately U-shaped, as clearly illustrated in Fig. 5 of the drawing, and engaging a lower horizontal guide bar 11 at the top and bottom thereof. The U-shaped hangers are provided with inner vertical attaching plates 12, secured to the sections 1 and 2 of the car door at the bottom thereof and extending downward from the sections to a point below the guide bar 11, whereby the lower portions of the sections of the car door are held against outward, upward and downward movement. The upper edges of the sections of the car door are free or unattached, but they are confined and guided by a horizontal guide bar 13, secured to the upper portion of the side of the car and extending across the car door at the top thereof.

The upper and lower guide bars may be constructed of round metal, as illustrated in Figs. 1 to 3 inclusive, or it may be square, as shown at 14 in Fig. 5. They are provided at an intermediate point with bends 15 and 16, located beyond the rear or inner edge of the front section 1, when the latter is in its closed position. The bends 15 and 16 extend outward and off-set the rear portions of the guide bars from the front portion thereof, the front portions being arranged to confine the front section 1 of the car door and hold the same against outward movement when the car door is closed, and the off-set rear portions being adapted to permit the sections of the car door to clear the side of the car in their opening movement. The bends 15 and 16 guide the front section of the door to its closed position, and the front portions of the guiding rods are of a length substantially the same as the width of the front section.

The rear section of the car door is equipped with a horizontally slidable latch bar 18, mounted in horizontally alined guides 19 and 20 and having an angularly disposed engaging portion 21 extending inwardly and rearwardly from the rear edge of the rear section and adapted to engage a suitable keeper 22. The angularly disposed terminal portion 21 forms a cam, and is adapted to force the rear section of the car door inwardly, whereby the said section 2 is held tightly in its closed position. The inner end of the latch bar is provided with an eye 23, and the section 2 of the car door is equipped with a staple 24, or other suitable eye. The eye 23 and the staple 24 are adapted to receive the wire of a car seal 25. The single locking device serves to fasten both the sections of the car door owing to the interlocking of the sections with each other and with the car, and the arrangement is such that either the rear section or both of the sections of the car door may be opened. This will save time and labor in handling freight, as only one of the sections need be opened when a small amount of freight is to be placed in or removed from the car. The car door sections are equipped at their lower portions with suitable handles 27, consisting of vertical loops and adapted to enable the door to be readily moved in either direction.

Having thus fully described my invention, what I claim as new and desire to secure by Letters Patent, is:

1. The combination of a car having upper and lower guides, a car door including front and rear sections, the front section when closed overlapped by the car at the front of the door opening and the rear section when closed overlapped by the front section, said car door being slidable along the guides and the latter having an off-set rear portion and provided with a front portion arranged to hold the front section of the door tightly in its closed position when the same is engaged by the rear section, and a fastening device arranged at the rear edge of the rear section and detachably securing the same to the car.

2. The combination of a car having upper and lower guides, a car door including front and rear sections, the front section when closed overlapped by the car at the front of the door opening and the rear section when closed overlapped by the front section, said door being slidable along the guides and the latter being provided at an intermediate point with outward bends off-setting the rear portions of the guides from the car to permit the sections to clear the latter at the rear edge of the door opening and arranged to guide the front section to its closed position, the front portions of the guides being arranged to hold the front section tightly in its closed position when it is engaged by the rear section.

3. The combination with a car having a door opening interiorly beveled at the front and exteriorly beveled at the rear, of a slidable car door exteriorly beveled at the front to engage with the car and interiorly beveled at the back to fit the bevel of the car and including front and rear sections, said sections being overlapped at their adjacent edges, upper and lower guide rods secured to the car and having their front portions arranged to hold the front sections against outward movement, said guide rods being provided at an intermediate point with outward bends off-setting their rear portions to permit the sections of the car door to clear the car at the rear edge of the door opening, and means for securing the rear section in its closed position.

4. The combination with a car having upper and lower guide rods, of a car door including front and rear sections, the front section when closed overlapped by the car at the front of the door opening and the rear section when closed overlapped by the front section, said car door being slidable along the guide rods and the latter being provided at an intermediate point with outward bends off-setting the rear portions of the guide rods from the car to permit the sections to clear the latter in opening and arranged to guide the front section to its closed position, the front portions of the guide rods being of a length equal to substantially the width of the front section of the door and operating to hold the same tightly in its closed position when the front section is engaged by the rear section.

5. The combination with a car, of upper and lower guide rods, and a sliding door provided at the bottom with outwardly extending hangers receiving the lower guide bar and engaging the same at the top, bottom and inner sides thereof, said hangers being open at the front and the upper edge of the door being free and extending above and slidable along the inner edge of the upper guide bar.

6. The combination with a car, of upper and lower guide rods, and a sliding door provided at the bottom with approximately U-shaped guides open at the front and extending outwardly and engaging the lower guide bar at the top and bottom and having attaching plates secured to the car door and extending downward therefrom to a point below the lower guide bar.

In testimony, that I claim the foregoing as my own, I have hereto affixed my signature in the presence of two witnesses.

HARRY CHAPLIN PERCY.

Witnesses:
HARLEY A. W. HOWCOTT,
L. J. SELLERS.